United States Patent
Kammerer et al.

(10) Patent No.: US 9,779,059 B2
(45) Date of Patent: Oct. 3, 2017

(54) COMMERCIAL VEHICLE, IN PARTICULAR FORK-LIFT TRUCK OR INDUSTRIAL TRUCK, WITH A DATA MEMORY THAT IS RIGIDLY ATTACHED ON THE VEHICLE SIDE AND ASSIGNED TO A PARAMETERISABLE ELECTRONIC CONTROL ARRANGEMENT

(71) Applicant: JUNGHEINRICH AKTIENGESELLSCHAFT, Hamburg (DE)

(72) Inventors: Markus Kammerer, Langenpreising (DE); Ralf Schade, Bad Bramstedt (DE); Robert Zens, Moosburg (DE); Michael Ries, Aschaffenburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 187 days.

(21) Appl. No.: 13/770,128

(22) Filed: Feb. 19, 2013

(65) Prior Publication Data
US 2013/0231831 A1 Sep. 5, 2013

(30) Foreign Application Priority Data
Feb. 16, 2012 (DE) .......... 10 2012 202 323

(51) Int. Cl.
*G06F 7/70* (2006.01)
*G06F 19/00* (2011.01)
(Continued)

(52) U.S. Cl.
CPC ............... *G06F 17/00* (2013.01); *B66F 9/24* (2013.01); *G06F 3/038* (2013.01)

(58) Field of Classification Search
CPC ........ G06F 3/038; B66F 17/003; B66F 9/063; G05D 2201/0216; F16H 61/00; G01M 17/00; G06Q 10/06315
(Continued)

(56) References Cited

U.S. PATENT DOCUMENTS 4,491,918 A   1/1985  Yuki et al.
4,913,250 A *  4/1990  Emori et al. ............... 180/422
(Continued)

FOREIGN PATENT DOCUMENTS

DE       38 07 999 A1    9/1989

OTHER PUBLICATIONS

European Search Report cited in the corresponding application No. 13155138.4-1705 dated Jun. 13, 2013, 8 pgs.

*Primary Examiner* — Mahmoud Ismail
(74) *Attorney, Agent, or Firm* — Rothwell, Figg, Ernst & Manbeck, P.C.

(57) ABSTRACT

A commercial vehicle comprises a functional arrangement comprising at least one drive motor for providing at least one working or operating function and a parameterisable electronic control arrangement configured to control the functional arrangement depending on a parameter dataset stored in the control arrangement. A data memory is provided, which is rigidly attached in the vehicle, separate from the control arrangement and in which at least one dataset relevant to the vehicle is stored or can be stored. The control arrangement is configured to read data of the dataset relevant to the vehicle from the data memory and/or to write data to the data memory for recording in the dataset relevant to the vehicle or to update the dataset relevant to the vehicle.

18 Claims, 1 Drawing Sheet

(51) Int. Cl.
*G06G 7/00* (2006.01)
*G06G 7/76* (2006.01)
*G06F 17/00* (2006.01)
*G06F 3/038* (2013.01)
*B66F 9/24* (2006.01)
*G01M 17/00* (2006.01)
*G06F 11/30* (2006.01)
*G07C 5/00* (2006.01)

(58) Field of Classification Search
USPC ............. 701/29.6, 50, 51, 32.4; 364/424.04; 180/422
See application file for complete search history.

(56) References Cited

U.S. PATENT DOCUMENTS

| | | | | |
|---|---|---|---|---|
| 5,113,344 | A | * | 5/1992 | Kellogg et al. ............... 701/29.6 |
| 5,365,176 | A | * | 11/1994 | Miller ............................ 324/539 |
| 6,061,617 | A | | 5/2000 | Berger et al. |
| 2007/0179692 | A1 | * | 8/2007 | Smith .............. G06Q 10/06315 701/32.4 |
| 2011/0197009 | A1 | * | 8/2011 | Agrawal ....................... 710/305 |
| 2012/0143447 | A1 | * | 6/2012 | Litscher et al. ................. 701/51 |

* cited by examiner

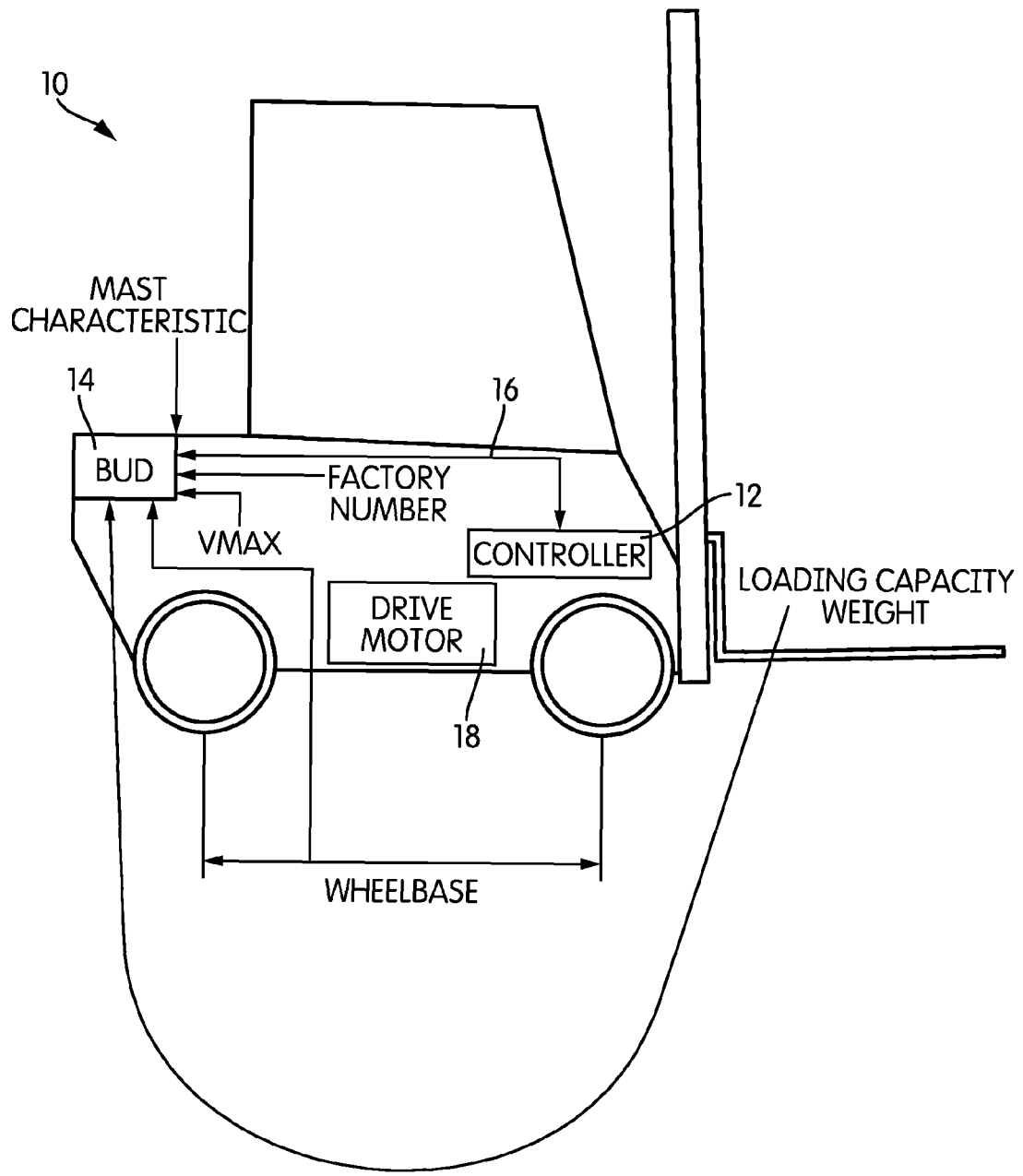

COMMERCIAL VEHICLE, IN PARTICULAR FORK-LIFT TRUCK OR INDUSTRIAL TRUCK, WITH A DATA MEMORY THAT IS RIGIDLY ATTACHED ON THE VEHICLE SIDE AND ASSIGNED TO A PARAMETERISABLE ELECTRONIC CONTROL ARRANGEMENT

BACKGROUND AND SUMMARY

According to a first aspect, the invention relates to a commercial vehicle, in particular a fork-lift truck or industrial vehicle, comprising a functional arrangement comprising at least one drive motor for providing at least one working or operating function including a travelling function, and comprising a parameterisable electronic control arrangement, which is configured or programmed to control the functional arrangement depending on a parameter dataset stored in the control arrangement in relation to switching on or off the working or operating function or a respective working or operating function and/or in relation to a type of implementation of the working or operating function or a respective working or operating function.

The behaviour of current commercial vehicles, especially including current fork-lift trucks and industrial trucks, is generally substantially influenced by parameterisable control software that runs in an electronic control arrangement. Some of these parameters are significant for functions relevant to security, in order to influence them, clear them or block them and to adapt the control software to hardware that can alternatively be installed or optionally also omitted.

It may occur during servicing, for example during maintenance or repair, that an electronic control arrangement currently installed in the commercial vehicle has to be exchanged. The service engineer then conventionally has to programme the parameter data valid for the relevant vehicle into the exchange control arrangement, and this is complex and susceptible to faults.

The object is to this extent posed of facilitating the parameterisation of the electronic control arrangement newly installed in the vehicle and to make it less susceptible to faults.

A further object is to ensure the parameter integrity and parameter compatibility in the event of an exchange of controller, which could optionally also be carried out by a user instead of the actual service engineer responsible.

A further object is to provide a simple and reliable possibility for a currently valid parameter dataset for later use, for example after an exchange of the electronic control arrangement.

In order to achieve, or as the basis for achieving, the solution to at least one of the objects mentioned, it is proposed that a vehicle be equipped with a data memory, which is rigidly attached in the vehicle, separate with respect to the control arrangement and in which at least one dataset relevant to the vehicle is stored or can be stored, the control arrangement being configured to read out data of the dataset relevant to the vehicle from the data memory in a read access via a data connection and/or, in a write access, to write data to the data memory for recording in the dataset relevant to the vehicle or to update the dataset relevant to the vehicle.

The data memory is rigidly attached, according to the invention, in the vehicle, in other words cannot be simply removed from the vehicle or replaced by another data memory. The data memory should therefore be non-detachably integrated into the vehicle, for example on or in the vehicle frame, in a cable set, which can only be removed from the vehicle or exchanged with a great deal of effort, and the like.

The data memory may also be used to store important vehicle data, preferably to ensure data integrity or only to store said vehicle data in a protected manner to prevent manipulations, for which conventional security methods such as encoding and protection by a check sum can be used. Important vehicle data, such as, for example, the vehicle serial number, relevant parameters for the functional arrangement, the equipment of the vehicle with parameter data characterising functional components, and so on, can be stored, or are stored in this data memory or are readable by the control arrangement.

It is taken into consideration here that the control arrangement, in a self-test, checks the integrity of the parameter dataset stored in itself, which contains important vehicle data such as the vehicle serial number and relevant parameters, and also checks the integrity of the data in the data memory, which is separate from the control arrangement, and carries out a comparison between the parameter dataset and the dataset of the data memory that is relevant to the vehicle.

In the case of faulty data or data differing from one another or data that does not correspond to one another, corresponding predefined vehicle reactions may then be triggered by the control arrangement. It is thus advisable for the control arrangement to emit acoustic and/or optical fault messages. Furthermore, functions relevant to security, especially working or operating functions of the functional arrangement, can be blocked or limited.

The data memory according to the invention also allows a service engineer, after the control arrangement has been exchanged, to restore the new control arrangement to the original state of the commercial vehicle rapidly and securely by an automated data download from the data memory.

Apart from securing the integrity and compatibility of relevant parameter data, in particular parameter data relevant to security, the data memory according to the invention also allows selective clearing of working or operating functions, which are coupled to a specific vehicle identified by the vehicle serial number. Functions of the commercial vehicle can thus be offered as additional functions subject to a charge.

The possibility has already been mentioned, at least implicitly, that the control arrangement, or at least one control arrangement module thereof, can be removed from the vehicle independently of the data memory and replaced by an exchange control arrangement or an exchange control arrangement module. This means that certain settings and parameters of the vehicle are not only stored on the component, which can be exchanged during a service and forms the control arrangement, and, in a sense, "disappear" with the removal of this component, but are retained during an exchange of controller both during an exchange for a replacement part and in the event of a "cross-exchange" between a plurality of commercial vehicles. The effort during the exchange is therefore reduced and possible faults through to security-critical faulty parameterisations can be avoided. The additional effort and, accordingly, also the service costs are reduced while simultaneously increasing the quality and security.

The above considerations mean that the data relevant to the vehicle and stored in the data memory may comprise the parameter dataset or a part set of the parameter dataset.

It can certainly be taken into consideration that the control arrangement and/or the data memory is configured for the control arrangement to be able to access that data memory only for reading but not writing. Data could then be stored in the data memory, which clearly identify the vehicle, such as the vehicle serial number, and which provide the hardware equipment of the vehicle. If the hardware equipment is changed, the data memory would then optionally have to be exchanged or reprogrammed by technical means external to the vehicle. Non-authorised manipulations can thus be very reliably prevented.

Another possibility is for the control arrangement and/or the data memory to be configured for the control arrangement to be able to access a first memory portion of the data memory only for reading but not for writing and to be able to access a second memory portion of the data memory for reading and writing. By means of this development approach, data, such as the serial number of the vehicle, can be stored in the first memory portion and data, such as, for example, parameters being selectively used, can be stored in the second memory portion.

A configuration of this type of the data memory with a first and a second memory portion of the type disclosed is not imperative, however, corresponding security against manipulation can also be achieved by the application of encodings and the like.

In general, it can be taken into consideration that the data memory or the second memory portion is configured as an electrically erasable programmable memory (EEPROM) or that the data memory or the first memory portion is configured as a read-only memory (ROM) or as an erasable programmable read-only memory (EPROM). It has already been mentioned that the data memory can be rigidly installed on or in a frame or a cable harness of the vehicle.

To provide the data connection between the data memory and the electronic control arrangement, in principle any data connections can be considered, such as, for example, a digital data bus or field bus. A data connection is preferred, which is rigidly installed in the vehicle. For example, the data connection may comprise at least one electric data line rigidly installed in the vehicle. The data connection is preferably formed by a serial two-wire bus, for example a synchronous serial two-wire bus, or—most preferably—by a serial one-wire bus. The so-called $I^2C$ bus or TWI bus is suitable, for example, as the two-wire bus.

As already mentioned, the control arrangement is preferably configured or programmed to read out data from the data memory and to check said data using data of the parameter data set stored in the control arrangement according to at least a first checking condition, and to respond to non-fulfillment of the checking condition by triggering at least one follow-up function and/or by blocking or limiting at least one working or operating function of the functional arrangement.

A readout and check of this type can, for example, take place after each restart or reset of the control arrangement or the vehicle, and/or when a specific working and operating function is to be carried out. A suitable follow-up function may be an indication or a warning, acoustically and/or optically, when the checking condition is not fulfilled.

It is furthermore proposed that the control arrangement be configured or programmed to read out data from the data memory and to check said data using data of the parameter dataset stored in the control arrangement according to at least one second checking condition, and to respond to a fulfillment of the checking condition by clearing or eliminating a restriction of at least one working or operating function of the functional arrangement. For example, selecting functions are considered here, which are only to be carried out by the control arrangement or the programme running in the control arrangement when said control arrangement is cleared for the relevant vehicle.

The invention also provides a control arrangement for a vehicle according to the invention, which is configured or programmed, after installation in the vehicle, for parameterisation in relation to the vehicle, to carry out a parameterising function, in which data are read out of the data memory and stored as a parameter data set in the control arrangement.

As a development, it is proposed that the control arrangement be configured or programmed for the parameterising function to only be able to be carried out when no parameter dataset has previously been stored in the control arrangement, or can only be carried out if a parameter dataset was previously stored in the control arrangement, when an authorisation function clears this, for example on the basis of the authorisation data fed to the control arrangement.

The control arrangement is preferably configured or programmed to read out data from the data memory and to check said data using data of a parameter dataset previously stored in the control arrangement according to at least one checking condition, and to respond to non-fulfillment of the checking condition by triggering at least one follow-up function and/or by blocking or limiting at least one working or operating function of the functional arrangement.

According to a second aspect, the invention provides a method for parameterising a control arrangement in relation to a vehicle according to the invention. In this method, data are read out from the data memory rigidly attached in the vehicle and stored as parameter data of a parameter dataset in the control arrangement of the vehicle.

Furthermore, according to a third aspect, the invention provides a method for securing parameter integrity and/or parameter compatibility of a parameter dataset stored in a control arrangement in relation to a vehicle according to the invention. In the method, data are read out from the data memory rigidly attached in the vehicle and compared with parameter data of a parameter dataset stored in the control arrangement. The data read out from the data memory and/or the parameter data of the parameter dataset are preferably checked for data integrity, most preferably before the comparison.

The invention will be described below without describing the generality with the aid of an embodiment relating to a fork-lift truck.

BRIEF DESCRIPTION OF THE DRAWINGS

The only figure (FIG. 1) schematically shows a fork-lift truck 10 with a drive motor 18 and an electronic control arrangement 12 designated a "controller" for short and a data memory 14 rigidly attached in the vehicle, designated "BUD" (back-up dongle) and arranged separately from the controller, which are connected via a data connection 16 rigidly installed in the vehicle.

DETAILED DESCRIPTION

The data memory or BUD 14 is expediently a so-called "two-wire EEPROM", which is preferably attached or integrated in the vehicle in such a way that it cannot be removed or exchanged, or only with a great deal of effort. For example, the data memory may be installed in the cable harness of the fork-lift truck, as the cable harness can generally be regarded as virtually fixed to the frame, because of the great deal of effort in exchanging a cable harness. It is also possible to consider integrating the data memory or BUD 14 rigidly in the vehicle frame, for example to glue it thereto.

The data connection 16 may expediently be configured as a two-wire bus according to the I²C bus specification, which was developed by Philips Semiconductors (nowadays known as NXP semiconductors), as a simple serial bidirectional two-wire bus for efficient Interchip connections. This bus is also known as an Inter-IC bus or TWI bus (TWI: two-wire interface).

Data that is important or even necessary for operation are stored in the data memory or BUD 14 and, for example, give the vehicle model series including, for example, the vehicle weight, wheelbase and the like, which, for example, give the individual characteristic of the vehicle with regard to optional equipment, for example installed mast of the fork-lift truck and the like, which, where necessary, give limitations, for example a speed limit to be adhered to, if this is less than the maximum admissible or maximum possible speed, load capacity (maximum admissible loading weight) of the mast and the like. Furthermore, the data memory or BUD may contain general data, in particular the "data fixed to the frame" mentioned, such as, for example, a vehicle number or serial number and a factory number.

These data may be stored in the BUD or data memory 14 from the start with the delivery of the vehicle or fork-lift truck. It is also conceivable, but less preferred, for such data to be stored by the controller 12 in the BUD 14.

Furthermore, a possibility is to store further data giving a current configuration of the vehicle, for example a current configuration of the lift mast of the fork-lift truck, in the data memory or BUD 14, for which the controller 12 may have a corresponding storage functionality. However, it is not imperative for all the parameters relevant to the operation of the vehicle or its functional arrangement, which the controller 12 holds in an internal memory or in internal registers, to be stored, or to be able to be stored, in the data memory or BUD 14, depending on the memory size of the data memory 14. However, all the parameters without which the vehicle cannot be operated, or not safely, should be stored in the data memory or BUD 14.

According to a preferred configuration, the controller 12 does not have any writing functionality at all in relation to the data memory 14 but only a reading functionality. All the data to be stored in the data memory are then stored in the data memory 14 on the factory side, where necessary also by a service engineer by means of a configuration device external to the vehicle. If the controller 12 is also to have a writing or storage functionality in relation to the data memory 14, specific data of the data memory can be stored by cryptographic methods against unauthorised changes. It is also possible for the data memory to be implemented with a first memory portion, which the controller 12 can access only for reading but not writing, and with a second memory portion, which the controller 16 can access both for reading and writing.

If the configuration of the vehicle or fork-lift truck 10 is reconfigured, for example the fork-lift truck mast is exchanged, the corresponding data also have to be modified in the data memory or BUD 14. A reprogramming of this type preferably takes place together with the corresponding reparameterisation of the controller 12, so that on the one hand, the internal data of the controller 12, and on the other hand the data stored in the data memory or BUD 14, are always consistent with one another.

The controller 12 is preferably configured, after a reset or restart (for example during the so-called "power up"), to read out data relevant to the vehicle from the data memory or BUD 14 and to compare said data with the corresponding data stored in the controller itself, if the controller itself has already been parameterised. Different cases can be distinguished, for example at least the following:

1. The controller 12 has not yet been parameterised, in other words does not contain corresponding data in an internal memory or in internal registers of the controller, because it is, for example, a newly installed exchange controller, in other words is started for the first time in the vehicle group. In this case, the controller can read out the data stored in the data memory or BUD 14 and store it in the internal data memory or in the internal registers of the controller, so the necessary parameterisation of the controller, or at least important parts thereof, is brought about completely, without manual and fault-prone effort by a service engineer. During the next reset or power up, the data thus stored in the controller are compared with data read out from the BUD or data memory 14.

2. The controller 12 has already been parameterised, in other words contains the necessary parameter dataset. The data comparison carried out after the reset or power up using the data read out from the data memory or BUD 14 should then lead to the result that the data on the controller side and on the data memory side are consistent with one another, so normal operation of the commercial vehicle with the provided working and operating functions can be cleared without restrictions. A lack of consistency between the data and also a lack of data integrity of the data on the data memory side, on the one hand, and/or the data on the data memory side, on the other hand, can indicate an existing problem, so a warning signal or a warning message could then expediently be emitted. The data integrity of the respective dataset can be secured by conventional check sum methods and checked by the controller.

3. The controller 12 has already been parameterised, but does not belong to the vehicle, in which it is now installed. The controller can recognise this based on the data stored in the data memory or BUD 14 and identifying the vehicle (in particular the vehicle or serial number) and, for example, may result from a cross-exchange of the controller with another vehicle. In this case, it may be provided that the controller uses the parameters stored in the data memory to operate the vehicle with regard to the working or operating functions provided, but optionally with certain functional restrictions for security reasons. The control arrangement 12 should then emit a warning or indication to the user that the controller and the vehicle do not fit together. An automatic reparameterisation of the control arrangement is conceivable, but is not preferred for security reasons. If a controller is then reinstalled in the original vehicle, the situation according to the second case is then present again and normal operation of the vehicle with the provided working or operating functions is possible without restrictions. If, the controller previously used with another vehicle is to remain in the new vehicle, the controller has to be reparameterised according to the preferred configuration, which is preferably only possible for a service engineer with corresponding technical equipment.

The provision according to the invention of a data memory rigidly attached in the vehicle and separate from the controller certainly makes it possible to provide specific operating and working functions actually technically only represented by software functionalities, to be provided as equipment options to be paid for separately, which, by means of the vehicle serial number (or similar data clearly identifying the vehicle) stored in the data memory or BUD 14 are clearly and identifiably coupled to a specific vehicle. This is not only advantageous from a business point of view, but also to increase the operating and working security, which may be functions, which are not admissible in every vehicle variant or all vehicle equipment.

Instead of a so-called "two-wire EEPROM" and a data connection 16 configured as a two-wire bus according to the I²C bus specification, a data memory, in particular EEPROM, and a data connection according to the so-called "1-wire" technology can also advantageously be used. According to the "two-wire" technology, like the I²C bus, two lines for energy supply are also required to supply the EEPROM in addition to the two communication lines, so, in total, a four-core connection is produced between the BUD 14 and the controller 12. In the "1-wire" or "one-wire" bus, a single data core (DQ) is used both for the current supply and also for the serial bidirectional data communication, in addition to the earth (GND) connection to close the current circuit. Using this technology, an effort-minimised, two-core solution can thus be realised, in which it would even be possible to also use the already present GND line in the cable harness of the vehicle for the energy supply of the "1-wire" EEPROM. The "1-wire" bus is also advantageous inasmuch as a plurality of memory modules connected in parallel are supported, which could be sensibly used to increase the storage capacity or the availability.

The invention claimed is:

1. A commercial vehicle, comprising:
   a functional arrangement comprising at least one drive motor for providing at least one working or operating function including a travelling function; and
   a parameterisable electronic control arrangement (12), which is configured or programmed to control the functional arrangement depending on a parameter dataset stored in the control arrangement in relation to switching on or off the working or operating function or a respective working or operating function and/or in relation to a type of implementation of the working or operating function or a respective working or operating function; and
   a data memory (14), which is rigidly attached and installed in a cable harness fixed to the frame of the vehicle, separate with respect to the control arrangement and in which at least one dataset relevant to the vehicle is stored or can be stored, the control arrangement being configured to read out data of the dataset relevant to the vehicle from the data memory (14) in a read access via a data connection (16) and/or, in a write access, to write data to the data memory (14) for recording in the dataset relevant to the vehicle or to update the dataset relevant to the vehicle,
   wherein control arrangement (12) is configured, after a reset or restart, to read out data relevant to the vehicle from the data memory (14) and to compare said data with the corresponding data stored in the control arrangement (12) by determining whether said data from the data memory (14) is consistent with the corresponding data in the control arrangement (12), if the control arrangement (12) has already been parametrised,
   wherein the control arrangement (12) emits a warning message in response to said data from the data memory (14) not being consistent with the corresponding data in the control arrangement (12).

2. The commercial vehicle according to claim 1, characterised in that the control arrangement (12), or at least one control arrangement module thereof, can be removed from the vehicle independently of the data memory (14) and can be replaced by an exchange control arrangement or an exchange control arrangement module.

3. The commercial vehicle according to claim 1, characterised in that the data relevant to the vehicle stored in the data memory (14) comprise the parameter dataset or a part data set of the parameter dataset.

4. The commercial vehicle according to claim 1, characterised in that the control arrangement (12) and/or the data memory (14) is configured for the control arrangement to be able to access the data memory only for reading but not writing.

5. The commercial vehicle according to claim 1, characterised in that the control arrangement (12) and/or the data memory (14) is configured for the control arrangement to be able to access a first memory portion of the data memory only for reading but not writing and to be able to access a second memory portion of the data memory for reading and writing.

6. The commercial vehicle according to claim 1, characterised in that the data memory (14) or the second memory portion is configured as an electrically erasable programmable read-only memory (EEPROM) or in that the data memory (14) or the first memory portion is configured as a read-only memory (ROM) or as an erasable programmable read-only memory (EPROM).

7. The commercial vehicle according to claim 1, characterised in that the data connection (16) comprises at least one electric data line rigidly installed in the vehicle, the data connection being formed by a serial two-wire bus or a serial one-wire bus.

8. The commercial vehicle according to claim 1, characterised in that the control arrangement (12) is configured or programmed to read out data from the data memory (14) and to check said data using data of the parameter dataset stored in the control arrangement according to at least a first checking condition, and to respond to non-fulfillment of the checking condition by triggering at least one follow-up function and/or by blocking or limiting at least one working or operating function of the functional arrangement.

9. The commercial vehicle according to claim 1, characterised in that the control arrangement (12) is configured or programmed to read out data from the data memory (14) and to check said data using data of the parameter dataset stored in the control arrangement according to at least a second checking condition, and to respond to a fulfillment of the checking condition by clearing or deleting a limitation of at least one working or operating functional arrangement.

10. The control arrangement for a vehicle according to claim 1, characterised in that the control arrangement (12) is configured or programmed, after installation in the vehicle (10) for parameterisation in relation to this vehicle, to carry out a parameterising function, in which data is read out from the data memory (14) rigidly attached in a cable harness of the vehicle and stored as a parameter dataset in the control arrangement.

11. The control arrangement according to claim 10, characterised in that the control arrangement (12) is configured or programmed for the parameterising function to only be able to be carried out when no parameter dataset has previously been stored in the control arrangement, or, if a parameter dataset has previously been stored in the control arrangement, can only be carried out when an authorisation function clears the previously stored dataset on the basis of authorisation data fed to the control arrangement.

12. The control arrangement according to claim 10, characterised in that the control arrangement (12) is configured or programmed to read out data from the data memory (14) and to check said data using data of a parameter dataset previously stored in the control arrangement according to at least one checking condition, and to respond to non-fulfillment of the checking condition by triggering at least one follow-up function and/or by blocking or limiting at least one working or operating function of the functional arrangement.

13. A method for parameterising a control arrangement in relation to the vehicle according to claim 1, characterised in that data are read out from the data memory (14) rigidly attached in the vehicle and stored in the control arrangement (12) as parameter data of a parameter dataset.

14. The method for ensuring a parameter integrity and/or parameter compatibility of a parameter dataset stored in a control arrangement (12) in relation to a vehicle according to claim 1, characterised in that data are read out from the data memory (14) rigidly attached in the vehicle and compared with parameter data of a parameter dataset stored in the control arrangement (12).

15. The method according to claim 14, characterised in that the data read out from the data memory (14) and/or the parameter data of the parameter dataset are checked for data integrity.

16. The commercial vehicle of claim 7, wherein the data connection comprises a synchronous serial two-wire bus comprising an I²C bus or TWI bus.

17. A commercial vehicle, comprising:
a functional arrangement comprising at least one drive motor for providing at least one working or operating function including a travelling function; and
a parameterisable electronic control arrangement (12), which is configured or programmed to control the functional arrangement depending on a parameter dataset stored in the control arrangement in relation to switching on or off the working or operating function or a respective working or operating function and/or in relation to a type of implementation of the working or operating function or a respective working or operating function; and
a data memory (14), which is rigidly attached and installed in a cable harness fixed to the frame of the vehicle, separate with respect to the control arrangement and in which at least one dataset relevant to the vehicle is stored or can be stored, the control arrangement being configured to read out data of the dataset relevant to the vehicle from the data memory (14) in a read access via a data connection (16) and/or, in a write access, to write data to the data memory (14) for recording in the dataset relevant to the vehicle or to update the dataset relevant to the vehicle,
wherein the control arrangement (12) is configured or programmed to read out data from the data memory (14) and to check said data using data of the parameter dataset stored in the control arrangement according to at least a first checking condition, and to respond to non-fulfillment of the checking condition by triggering at least one follow-up function and/or by blocking or limiting at least one working or operating function of the functional arrangement,
wherein the checking is a comparison of said data from the data memory (14) with said data of the parameter dataset stored in the control arrangement, wherein if the comparison leads to the result the data on the control arrangement side and on the data memory side are consistent with one another, normal operation of the commercial vehicle is cleared, wherein otherwise a warning signal or a warning message is emitted.

18. A commercial vehicle, comprising:
a functional arrangement comprising at least one drive motor for providing at least one working or operating function including a travelling function; and
a parameterisable electronic control arrangement (12), which is configured or programmed to control the functional arrangement depending on a parameter dataset stored in the control arrangement in relation to switching on or off the working or operating function or a respective working or operating function and/or in relation to a type of implementation of the working or operating function or a respective working or operating function; and
a data memory (14), which is rigidly attached and installed in a cable harness fixed to the frame of the vehicle, separate with respect to the control arrangement and in which at least one dataset relevant to the vehicle is stored or can be stored, the control arrangement being configured to read out data of the dataset relevant to the vehicle from the data memory (14) in a read access via a data connection (16) and/or, in a write access, to write data to the data memory (14) for recording in the dataset relevant to the vehicle or to update the dataset relevant to the vehicle,
wherein the control arrangement (12) is configured or programmed to read out data from the data memory (14) and to check said data using data of the parameter dataset stored in the control arrangement according to at least a first checking condition, and to respond to non-fulfillment of the checking condition by triggering at least one follow-up function and/or by blocking or limiting at least one working or operating function of the functional arrangement,
wherein the checking is a comparison of said data from the data memory (14) with said data of the parameter dataset stored in the control arrangement, wherein if the comparison leads to the result that the data on the control arrangement side and on the data memory side are consistent with one another, normal operation of the commercial vehicle is cleared, wherein otherwise a warning signal or a warning message is emitted,
the control arrangement (12) is configured or programmed to read out data from the data memory (14) and to check said data using data of the parameter dataset stored in the control arrangement according to at least a second checking condition, and to respond to a fulfillment of the checking condition by clearing or deleting a limitation of at least one working or operating functional arrangement,
wherein the second checking condition is whether the control arrangement (12) has already been parametrised, but does not belong to the vehicle, in which it is now installed, wherein clearing of working or operating functions restricted based upon the parameters stored in the data memory (14) happens in response to a fulfillment of the second checking condition.

* * * * *